US012679643B2

(12) United States Patent
Tsuji

(10) Patent No.: US 12,679,643 B2
(45) Date of Patent: Jul. 14, 2026

(54) TRANSFER DEVICE

(71) Applicant: MURATA MACHINERY, LTD.,
Kyoto (JP)

(72) Inventor: Yuji Tsuji, Inuyama (JP)

(73) Assignee: MURATA MACHINERY, LTD.,
Kyoto (JP)

( * ) Notice: Subject to any disclaimer, the term of this
patent is extended or adjusted under 35
U.S.C. 154(b) by 307 days.

(21) Appl. No.: 18/706,916

(22) PCT Filed: Oct. 7, 2022

(86) PCT No.: PCT/JP2022/037567
§ 371 (c)(1),
(2) Date: May 2, 2024

(87) PCT Pub. No.: WO2023/084960
PCT Pub. Date: May 19, 2023

(65) Prior Publication Data

US 2025/0019163 A1    Jan. 16, 2025

(30) Foreign Application Priority Data

Nov. 15, 2021    (JP) ................................. 2021-185824

(51) Int. Cl.
B65G 1/04        (2006.01)
B65G 43/02       (2006.01)
(52) U.S. Cl.
CPC .............. B65G 1/04 (2013.01); B65G 43/02
(2013.01)

(58) Field of Classification Search
CPC .... B65G 1/0435; B65G 1/0407; B65G 43/02;
B65G 1/04; B65G 59/023; B25J 15/0047;
B66F 9/07
(Continued)

(56) References Cited

U.S. PATENT DOCUMENTS 5,135,344 A * 8/1992 Kita ..................... B65G 1/0492
414/280
5,203,661 A * 4/1993 Tanita .................. H05K 13/021
414/280

(Continued)

FOREIGN PATENT DOCUMENTS

JP       2002-362711 A     12/2002
JP       2004342680 A  *  12/2004
(Continued)

*Primary Examiner* — Gregory W Adams
(74) *Attorney, Agent, or Firm* — Keating & Bennett, LLP

(57)        ABSTRACT
A transfer device includes a hook, a forward and backward
movable device, a hook driver to move the hook, a forward
and backward movement driver to move the forward and
backward movable device forward or backward, and a drive
controller configured or programmed to control the hook
driver and the forward and backward movement driver. The
drive controller is configured or programmed to include a
hook position assessor to assess the hook position based on
a position threshold, a hook controller to stop the hook when
an overload on the hook driver has been detected, and a
controller of the forward and backward movement driver
configured or programmed to move the hook forward or
backward when the hook position obtained when the hook
controller stops the hook driver is greater than or equal to the
position threshold.

4 Claims, 4 Drawing Sheets

(58) Field of Classification Search
USPC ......................................... 414/280, 273, 661
See application file for complete search history.

(56) References Cited

U.S. PATENT DOCUMENTS

| | | | | |
|---|---|---|---|---|
| 5,346,352 | A * | 9/1994 | Ito ........................... | B65G 65/00 |
| | | | | 414/400 |
| 10,179,698 | B2 * | 1/2019 | Torazawa ............. | B65G 1/0435 |
| 10,457,526 | B2 * | 10/2019 | Inglis ................... | G01L 5/0071 |
| 2017/0066591 | A1 | 3/2017 | Torazawa | |

FOREIGN PATENT DOCUMENTS

| | | | |
|---|---|---|---|
| JP | 2017-052599 | A | 3/2017 |
| JP | 2017-052600 | A | 3/2017 |

* cited by examiner

TRANSFER DEVICE

BACKGROUND OF THE INVENTION

1. Field of the Invention

The present invention relates to a transfer device that transfers a load from a predetermined holder to another holder.

2. Description of the Related Art

For instance, as described in Japanese Unexamined Patent Application Publication No. 2017-52600, a transfer device that transfers a load by moving forward or backward a hook engaging with the load is conventionally known. When a hook is not properly engaging with a load, such a transfer device detects an overload on a drive motor for driving the hook and deals with the overload as an error. When an overload error is output, the transfer device is stopped to check the state, and maintenance is carried out as necessary.

SUMMARY OF THE INVENTION

However, the inventor of the present application discovered the following: even if an overload error has occurred, in some cases, a hook is sufficiently engaging with a load, and it is possible to transfer the load.

Example embodiments of the present invention provide transfer devices that each can continue transfer operation even if an overload error has occurred.

In view of the above, a transfer device according to one aspect of an example embodiment of the present invention includes a hook to engage with a load, a forward and backward movable device to move the hook forward or backward, a hook driver to move the hook between an engaged position at which the hook engages with the load and a retreated position to which the hook retreats, a forward and backward movement driver to drive the forward and backward movable device, and a drive controller configured or programmed to control the hook driver and the forward and backward movement driver, wherein the drive controller is configured or programmed to include a hook position assessor configured or programmed to obtain a hook position that is a position of the hook, and assess the hook position based on a position threshold, a hook controller configured or programmed to control the hook driver to stop the hook when an overload on the hook driver has been detected, and a controller of the forward and backward movement driver configured or programmed to control the forward and backward movement driver to move the hook forward or backward, when the hook position obtained when the hook controller stops the hook driver is greater than or equal to the position threshold.

In example embodiments of the present invention, even if an overload error has occurred, the drive controller assesses the position of the hook, and the transfer device can continue transfer operation.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Example embodiments of transfer devices according to the present invention are described below with reference to the drawings. It should be noted that the example embodiments described below is are merely examples for explaining the present invention and does not intend to limit the present invention. For instance, the shapes, structures, materials, structural elements, relative positional relationships, connections, numerical values, numerical formulas, processing of each step of a method, and order of the steps described in the example embodiments below are mere examples and may include details not described in the example embodiments. Although geometrical expressions such as parallel and orthogonal may be used, the expressions do not represent mathematical precision and include substantially allowable errors and differences. Expressions such as concurrently and same also include substantially allowable ranges.

In addition, the figures are schematic diagrams in which emphasis, omission, or ratio adjustment is performed as necessary in order to explain the present invention. The shapes, positional relationships, and ratios in the figures differ from actual shapes, positional relationships, and ratios.

Two or more example embodiments of the present invention may be comprehensively described as one example embodiment. Some of the elements described below are described as optional structural elements pertaining to example embodiments of the present invention.

Figure 1:
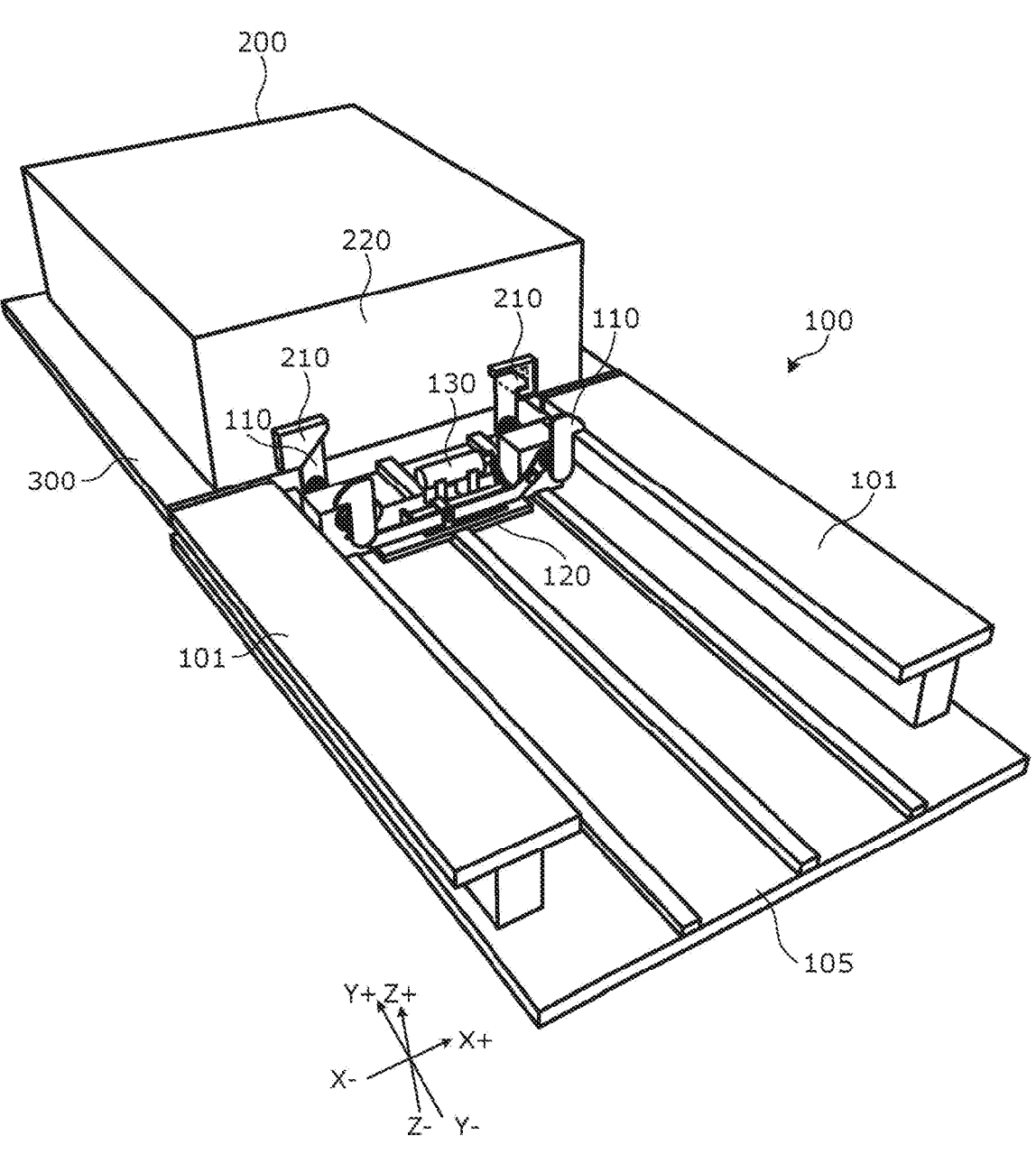
FIG. 1 is a perspective view of a transfer device illustrated together with holders and a load.
Figure 2:
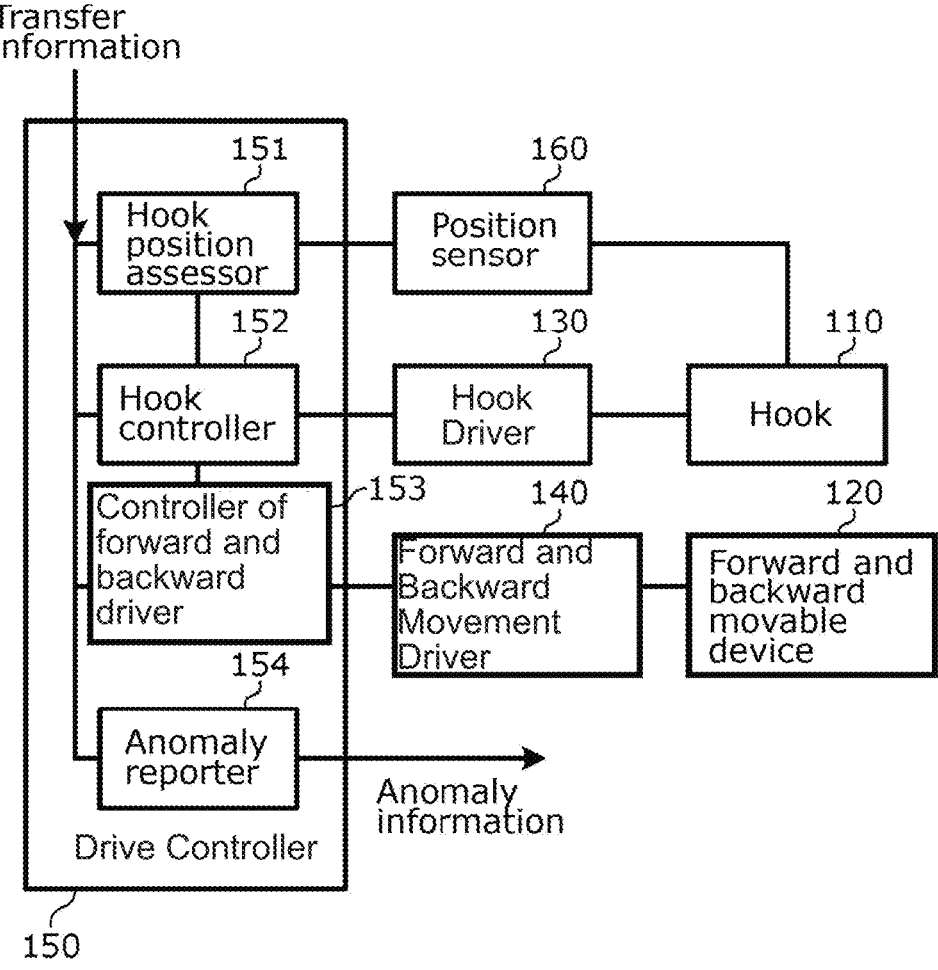
FIG. 2 is a block diagram illustrating a functional configuration of the transfer device.

FIG. 1 is a perspective view of a transfer device illustrated together with holders and a load. FIG. 2 is a block diagram illustrating a functional configuration of the transfer device. Transfer device 100 transfers load 200 along first holder 300 and second holder 101. Transfer device 100 includes hooks 110, forward and backward movable device 120, hook driver 130, forward and backward movement driver 140, drive controller 150, and position sensor 160. In the present example embodiment, transfer device 100 transfers load 200 by sliding load 200 along the surfaces of first holder 300 and second holder 101. Transfer device 100 is attached to, for example, a carrying device (not illustrated) capable of carrying load 200, such as a stacker crane or a running vehicle.

Load 200 is held by first holder 300 to hold load 200 of a device different from transfer device 100 or load 200 of equipment such as a rack. Load 200 is a target to be transferred along first holder 300 and second holder 101, and includes engaged portions 210 that fit to hooks 110 of transfer device 100.

Engaged portions 210 are positioned a predetermined distance apart from external surface 220 in one of the transfer directions in which load 200 is transferred (the minus side of the Y axis in FIG. 1). Here, external surface 220 intersects a direction in which load 200 is transferred (a Y-axis direction in FIG. 1). Engaged portions 210 are designed to be engaged with hooks 110 of transfer device 100 in the transfer direction, and receive force for transferring load 200, from hooks 110. In the present example embodiment, engaged portions 210 are monolithically attached to external surface 220 of load 200, and two engaged portions 210 are arranged plane-symmetrically. It should be noted that load 200 does not have to include engaged portion 210 of a special shape. Instead, for example, the front end surface and the back end surface of load 200 may function as engaged portions 210.

Second holder 101 is included in transfer device 100 to hold load 200. In the example embodiment, second holder 101 is a counterpart of first holder 300 and a plate-shaped portion to hold load 200 placed thereon, and is capable of holding, from below, both end portions of load 200 in a width direction of load 200.

Hook 110 is a component designed to engage with engaged portion 210 of load 200, and hook 110 moves between the engaged position at which hook 110 engages with engaged portion 210 and the retreated position at which hook 110 is not engaged with engaged portion 210. In the present example embodiment, by rotating hook 110 around a rotation axis in the transfer direction (the Y-axis direction in FIG. 1), hook 110 is put into engaged portion 210 of load 200, which can provide, via hook 110, engaged portion 210 with a force to transfer load 200. Transfer device 100 includes two hooks 110 that are symmetrical with respect to a Y-Z plane in FIG. 1 and rotate in the opposite direction. Furthermore, transfer device 100 includes two pairs of plane-symmetrical hooks 110 in the transfer direction. Thus, it is possible to transfer load 200, on whichever side in the transfer direction load 200 is placed.

Forward and backward movable device 120 is a device to move hooks 110 forward or backward in the transfer direction, and is capable of causing load 200 to reciprocate in the transfer directions, via hooks 110 engaging with engaged portions 210 of load 200 or external surface 220 of load 200. In the present example embodiment, forward and backward movable device 120 concurrently causes four hooks 110 to reciprocate in the transfer directions. Specifically, forward and backward movable device 120 includes, for instance, a rail along which hooks 110 are guided in the transfer directions and a linear-motion driver that causes hooks 110 to reciprocate.

Hook driver 130 is a device to move hook 110 between the engaged position at which hook 110 engages with engaged portion 210 and the retreated position to which hook 110 retreats, and includes a motor. In the present example embodiment, hook driver 130 is connected to four hooks 110 via a conversion mechanism in which mechanical elements are combined. Hook driver 130 can concurrently cause four hooks 110 to rotate and swing plane-symmetrically.

The type of hook driver 130 is not limited to a particular type. In the present example embodiment, hook driver 130 includes, for example, a servo amplifier, a servo motor driven by the servo amplifier, and a reducer.

Forward and backward movement driver 140 is a drive unit to move forward and backward movable device 120 forward or backward. The type of forward and backward movement driver 140 is not limited to a particular type. In the present example embodiment, as with hook driver 130, forward and backward movement driver 140 includes, for example, a servo amplifier, a servo motor driven by the servo amplifier, and a reducer.

Position sensor 160 is a sensor to detect the hook position that is the position of hook 110 positioned at the engaged position, the retreated position, or a position between the engaged position and the retreated position. The type of position sensor 160 is not limited to a particular type. In the present example embodiment, an optical encoder is used. Position sensor 160 is attached to a shaft connected to two hooks 110 aligned in the transfer direction. It should be noted that position sensor 160 may be a potentiometer, a resolver, or a sensor included in hook driver 130, which is a servo motor.

Drive controller 150 is configured or programmed to control hook driver 130 and forward and backward movement driver 140 to cause hooks 110 and forward and backward movable device 120 to perform predetermined motions. Drive controller 150 is configured or programmed to include hook position assessor 151, hook controller 152, and controller 153 of the forward and backward movement driver, as processing units implemented by a processor executing a program. In the example embodiment, drive controller 150 includes anomaly reporter 154.

Hook position assessor 151 is a processing unit or processor configured or programmed to obtain the hook position that is the position of hook 110 from position sensor 160 and determine whether the hook position exceeds a position threshold. In the present example embodiment, for instance, when the retreated position is set to zero and the engaged position is set to 255, hook position assessor 151 obtains the hook position as a predetermined resolution on the basis of information obtained from position sensor 160, and determines whether the hook position is greater than or equal to the position threshold. Hook position assessor 151 also determines that hook 110 is positioned at the retreated position or at the engaged position, for example. The position threshold which is a criterion for assessment by hook position assessor 151 is not limited to a particular value. As an example, the position threshold is an empirically derived value of a position at which hook 110 is not at the engaged position but is fairly engaging with engaged portion 210, which makes transferring possible.

When detecting an overload on hook driver 130 during movement of hook 110 toward the engaged position, hook controller 152 is configured or programmed to control hook driver 130 to stop hook 110. In the present example embodiment, when a load exceeds a first load threshold, the servo amplifier of hook driver 130 outputs overload information and causes the servo motor to make an irregular stop, thereby stopping hook 110. Hook controller 152 obtains load information on the load from hook driver 130. When detecting an overload from the obtained load information and a second load threshold lower than the first load threshold, hook controller 152 controls hook driver 130 to stop hook 110 before obtaining the overload information. Specifically, hook controller 152 stops hook 110 by stopping an instruction for the servo motor to move in the direction of motion of the servo motor. In this way, hook controller 152 can stop the motion of hook 110 before a large load is placed on hook driver 130. The load information is information related to the torque of the servo motor, and information based on, for example, the current value of a current supplied to the servo motor by the servo amplifier.

When hook position assessor 151 determines that the hook position obtained when hook controller 152 stops hook driver 130 is less than the position threshold, hook controller 152 controls hook driver 130 to move hook 110 to the retreated position.

It should be noted that when the load indicated in the load information continues to exceed the second load threshold for at least a threshold time period, hook controller 152 may control hook driver 130 to stop hook 110. This control can prevent an occurrence of an instantaneous increase in the load indicated in the load information, which enables stable control of hook 110.

When hook position assessor 151 determines that the hook position obtained when hook controller 152 stops hook driver 130 is greater than or equal to the position threshold, controller 153 of the forward and backward movement driver controls forward and backward movement driver 140 to move hook 110 forward or backward on the basis of transfer information, while maintaining the state of stopped hook 110. Thus, even in a state in which hook 110 has not reached the engaged position, it is possible to transfer load 200.

When hook position assessor 151 determines that the hook position obtained when hook controller 152 stops hook driver 130 is less than the position threshold, hook controller 152 controls hook driver 130 to move hook 110 to the retreated position. Then, controller 153 of the forward and backward movement driver controls forward and backward movement driver 140 to move hook 110 forward or backward on the basis of the transfer information. Thus, load 200 remains without being transferred, and hook 110 moves backward and away from first holder 300.

When hook position assessor 151 determines that the hook position obtained when hook controller 152 stops hook driver 130 is less than the position threshold, anomaly reporter 154 reports anomaly information. A method for reporting the anomaly information is not limited to a particular method. For instance, the anomaly information may be output to a computer. For instance, the anomaly information may be reported to a user by, for example, sound, light, characters, and an image.

Figure 3:
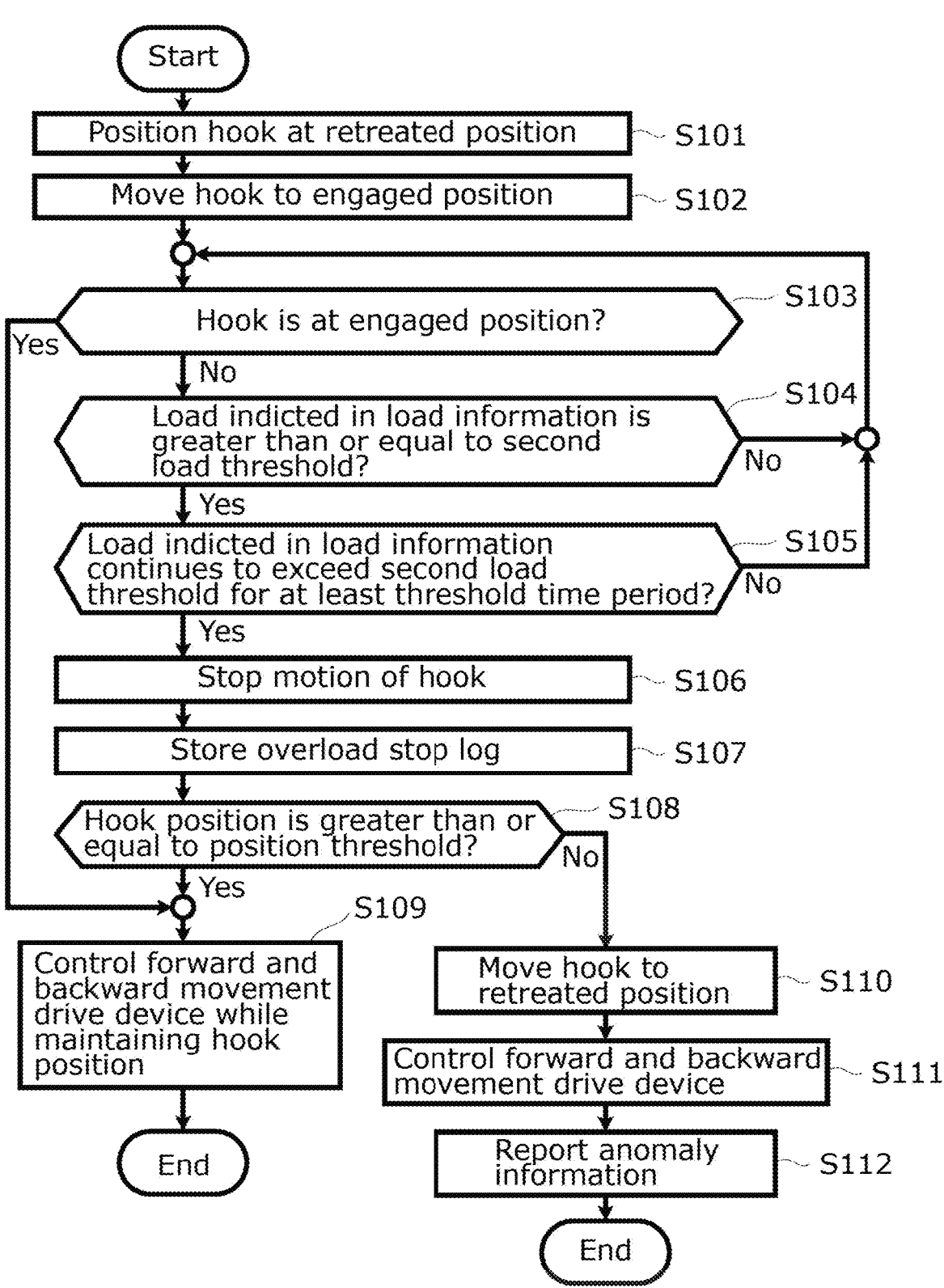
FIG. 3 is a flowchart illustrating a procedure of processing performed by a drive controller.

A procedure of processing performed by drive controller 150 is described below. FIG. 3 is a flowchart illustrating a procedure of processing performed by the drive controller. It should be noted that the flowchart illustrated in FIG. 3 is an example. Thus, an example embodiment of the present invention may include cases with procedures different from the procedure of the processing in the flowchart, such as a case where the processing order differs from that in the flowchart, a case where some processing tasks are combined into one, and a case where one processing task is divided. On the basis of obtained transfer information, controller 153 of the forward and backward movement driver is configured or programmed to control forward and backward movement driver 140 to position hook 110 at the retreated position relative to engaged portion 210 of load 200 (S101). When hook 110 is positioned at the retreated position, hook controller 152 is configured or programmed to control hook driver 130 to move hook 110 to the engaged position.

When hook position assessor 151 obtains the position of hook 110 on the basis of information obtained from position sensor 160 and determines that hook 110 has not reached the engaged position (No in S103), hook controller 152 obtains load information on a torque from hook driver 130 and determines whether a load indicated in the load information exceeds the second load threshold (S104). When the load indicated in the load information is less than the second load threshold (No in S104), the procedure returns to the step (S103) to check the position of hook 110. When the load indicated in the load information is greater than or equal to the second load threshold (Yes in S104), hook position assessor 151 determines whether the load indicated in the load information continues to exceed the second load threshold for at least the threshold time period (S105). When the load indicated in the load information does not continue to exceed the second load threshold for at least the threshold time period (No in S105), the procedure returns to the step (S103) to check the position of hook 110.

When the load indicated in the load information continues to exceed the second load threshold for at least the threshold time period (Yes in S105), hook controller 152 controls hook driver 130 to stop the motion of hook 110 (S106). In this state, hook controller 152 performs control to stop an instruction for the servo motor to move in the direction of motion of the servo motor, and can further control hook driver 130 to move hook 110. In addition, hook controller 152 stores an overload stop log (S107). The details of the overload stop log are not limited to particular details. Examples of the details include a value (torque) indicated in additional information detected in the end and the stopped position of hook 110.

Hook position assessor 151 determines whether the hook position obtained from position sensor 160 is greater than or equal to the position threshold (S108). When the hook position is greater than or equal to the position threshold (Yes in S108), controller 153 of the forward and backward movement driver drives forward and backward movement driver 140 on the basis of the transfer information and transfers load 200, while maintaining hook 110 at the position at which hook 110 was stopped by hook controller 152 (S109). Meanwhile, when the hook position is less than the position threshold (No in S108), hook controller 152 controls hook driver 130 to move hook 110 to the retreated position (S110). When hook 110 reaches the retreated position, controller 153 of the forward and backward movement driver controls forward and backward movement driver 140 to position hook 110 and forward and backward movable device 120 at positions where maintenance can be carried out (S111). Anomaly reporter 154 reports anomaly information (S112). The anomaly information may include the details of the log stored in step S107.

When the anomaly information is reported, equipment including transfer device 100 may stop operation and undergo maintenance. In addition, transfer device 100 may stop only the transfer of load 200 that was about to be transferred, and continue to transfer other loads 200.

In transfer device 100 according to the present example embodiment, even when hook 110 stops due to an overload, whether load 200 is transferred is determined on the basis of the stopped position of hook 100. This can reduce the number of times transfer device 100 and the equipment including transfer device 100 stop, which can improve the efficiency of transferring load 200.

Before a device such as the servo amplifier of hook driver 130 detects an overload on the basis of the first load threshold and causes hook 110 to make an irregular stop, hook controller 152 detects, as software, an overload on the basis of the second load threshold lower than the first load threshold. Thus, it is possible to reduce the duration of compulsory stop of hook 110 by the device such as the servo amplifier and shorten the recovery time.

In addition, it is possible to shorten the time taken to carry out maintenance for recovery, by moving forward and backward movable device 120 to the position where maintenance can be carried out and reporting anomaly information.

It should be noted that the present invention is not limited to the above example embodiments. As example embodiments, the present invention may include example embodiments achieved by any combination of the structural elements described herein and example embodiments achieved by removing some of the structural elements. Furthermore, the present invention includes variations achieved by making various changes envisioned by those skilled in the art to the above example embodiments within the scope of the present invention, that is, within the meanings of the expressions recited in the claims.

For instance, forward and backward movable device 120 may include an extendable arm, and hook 110 may be attached to an end portion of the extendable arm. Load 200 may be transferred from first holder 300 to second holder 101 by extending the arm along one side of load 220, hooking hook 110 on the back end surface of load 200, and pulling the arm back. Load 200 may be transferred from second holder 101 to first holder 300 by hooking hook 110 on the front end surface of load 200 and moving the arm forward.

Figure 4:
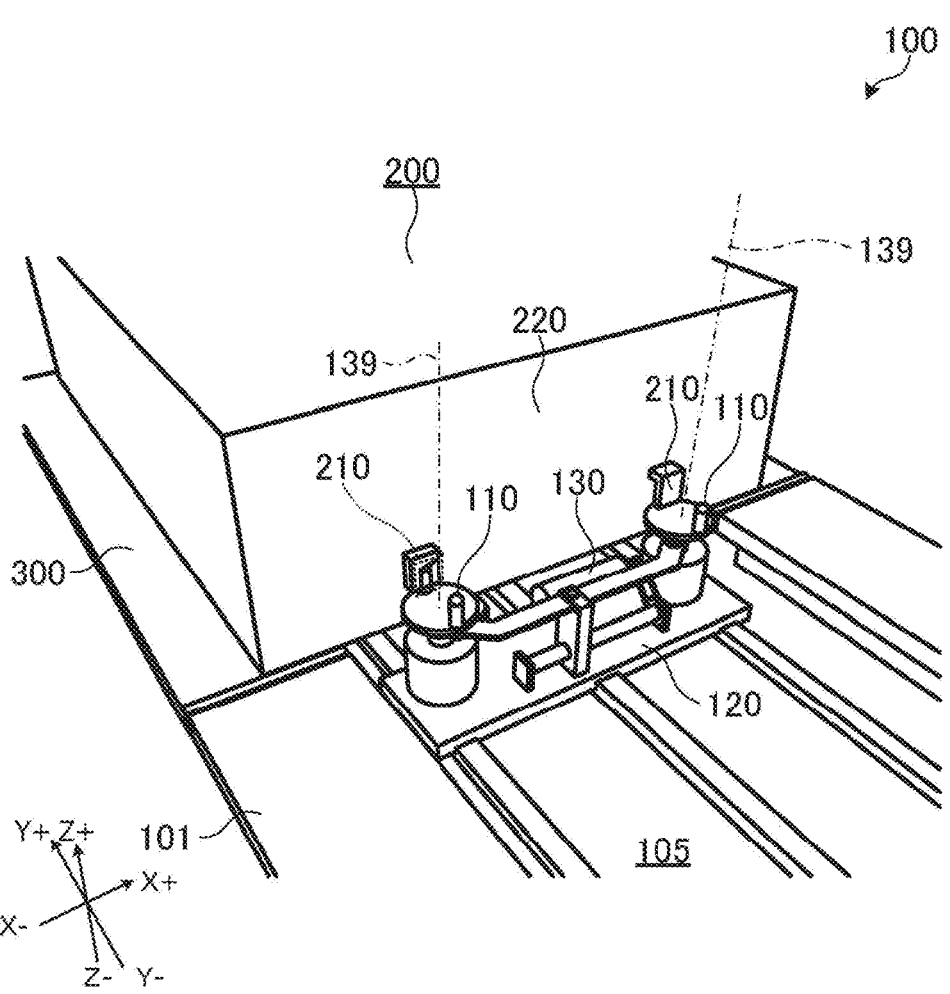
FIG. 4 illustrates another example of hooks and a hook driver.

Not only hook 110 designed to rotate around the rotation axis in the transfer direction (the Y-axis direction in FIG. 1), as illustrated in FIG. 4, but also hook 110 designed to rotate around rotation axis 139 extending in a vertical direction may be used. Furthermore, hook 110 may move linearly instead of rotating.

In addition, a given holding state of load 200 is applicable. For instance, in addition to a case in which load 200 is held in a placed state, a case in which load 200 is held in a hanging state is included.

Example embodiments of the present invention are applicable to transfer devices to transfer loads in automated warehouses, logistics base stations, and in picking systems, for example.

While example embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A transfer device comprising:
   a hook to engage with a load;
   a forward and backward movable device to move the hook forward or backward;
   a hook driver to move the hook between an engaged position at which the hook engages with the load and a retreated position to which the hook retreats;
   a forward and backward movement driver to drive the forward and backward movable device; and
   a drive controller configured or programmed to control the hook driver and the forward and backward movement driver; wherein the drive controller is configured or programmed to include:
   a hook position assessor configured or programmed to obtain a hook position that is a position of the hook, and assess the hook position based on a position threshold;
   a hook controller configured or programmed to control the hook driver to stop the hook when an overload on the hook driver has been detected; and
   a controller of the forward and backward movement driver configured or programmed to control the forward and backward movement driver to move the hook forward or backward, when the hook position obtained when the hook controller stops the hook driver is greater than or equal to the position threshold.

2. The transfer device according to claim 1, wherein the hook controller is configured or programmed to control the hook driver to move the hook to the retreated position, when the hook position obtained when the hook controller stops the hook driver is less than the position threshold;
   after the hook moves to the retreated position, the controller of the forward and backward movement driver is configured or programmed to control the forward and backward movement driver to move the hook forward or backward; and
   the drive controller is configured or programmed to include an anomaly reporter configured or programmed to report anomaly information when the hook position obtained when the hook controller stops the hook driver is less than the position threshold.

3. The transfer device according to claim 1, wherein the hook driver is operable to output overload information based on a first load threshold; and
   the hook controller is configured or programmed to obtain load information on a load from the hook driver, and control the hook driver to stop the hook when an overload from the load information and a second load threshold lower than the first load threshold has been detected.

4. The transfer device according to claim 3, wherein the hook controller is configured or programmed to control the hook driver to stop the hook when the load indicated in the load information continues to exceed the second load threshold for at least a threshold time period.

* * * * *